Patented Nov. 8, 1927.

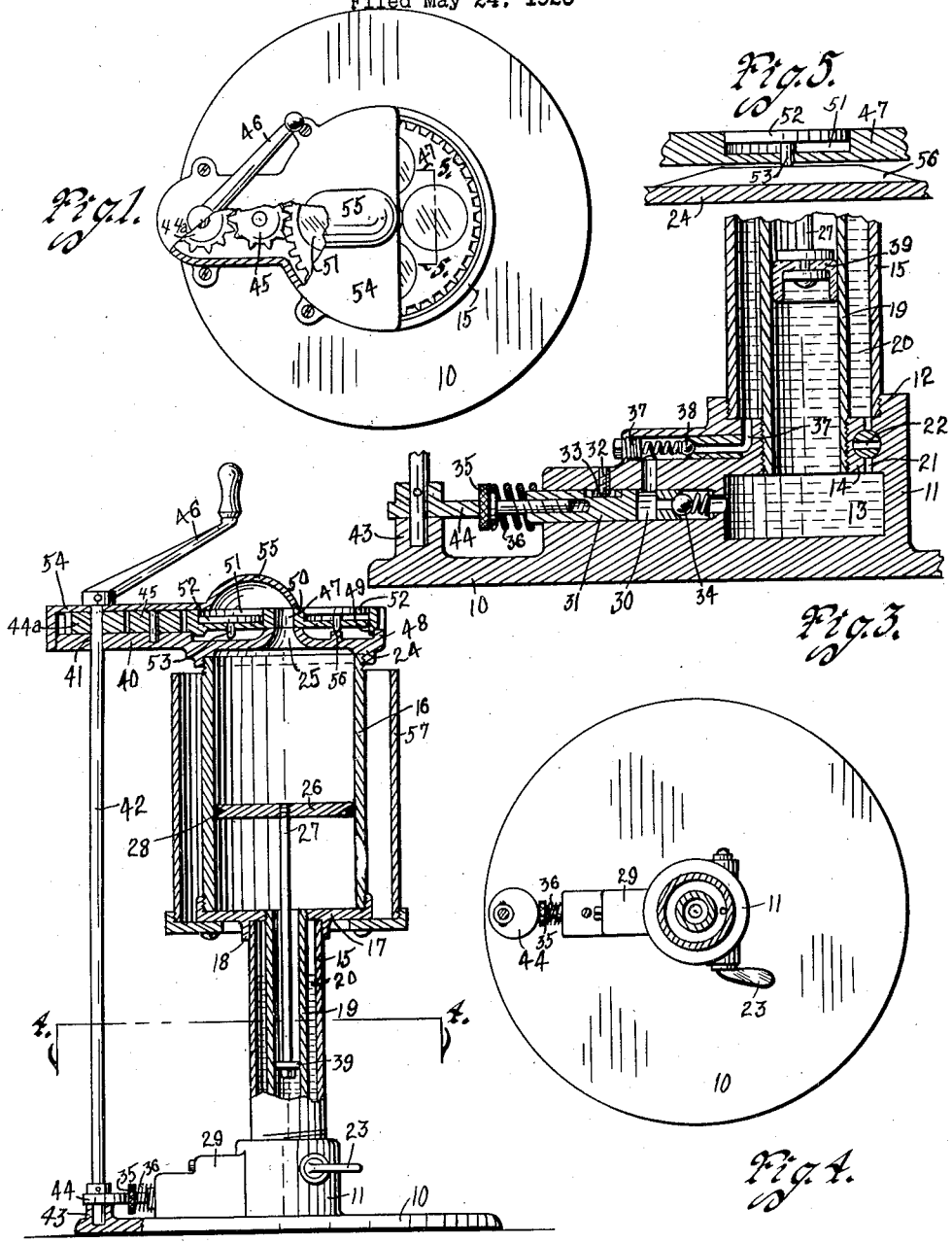
Nov. 8, 1927.
D. A. WALLACE
HAMBURGER PRESS
Filed May 24, 1926
1,648,834

1,648,834

UNITED STATES PATENT OFFICE.

DAVID A. WALLACE, OF WATERLOO, IOWA, ASSIGNOR, BY MESNE ASSIGNMENTS, OF TWO-THIRDS TO GEM DOUGHNUT MACHINE COMPANY, OF WATERLOO, IOWA.

HAMBURGER PRESS.

Application filed May 24, 1926. Serial No. 111,267.

The object of my invention is to provide a device for automatically forming hamburger patties or patties of other soft pliable material of uniform size and shape.

Still a further object is to provide a container for hamburger or the like adapted to have a piston therein movable for forcing a certain amount of hamburger into forms or molds and thereafter raising the contents within the molds so that it may be removed in the form of a complete patty.

Still a further object is to provide hydraulic means for operating the piston within the container for the forcing of the contents within the container into the molds provided therefor.

With these and other objects in view, my invention consists in the construction, arrangement and combination of the various parts of my hamburger press, whereby the objects contemplated are attained, as hereinafter more fully set forth, pointed out in my claims, and illustrated in the accompanying drawings, in which:

Figure 1, is a top plan view of my improved hamburger press, parts being broken away to better illustrate the construction.

Figure 2, is a central vertical sectional view through the same.

Figure 3, is an enlarged detail sectional view illustrating the hydraulic means for operating the piston of my device.

Figure 4, is a detail sectional view taken on line 4—4 of Figure 2, and

Figure 5, is a detail sectional view taken on line 5—5 of Figure 1 illustrating the elevating means for the pallets.

My device includes a base 10 having a boss 11 formed thereon interiorly screw threaded as at 12. The boss 11 includes an enlarged opening or chamber 13 with a contracted neck 14 also interiorly screw threaded.

Received within the screw threads 12 is an oil casing 15 supporting at its upper end a container 16. The container 16 is cylindrical and is connected to the upper end of the casing 15 by a closure plate 17. The plate 17 is screw threaded to the container 16 and is formed with a down turned rib or flange 18 which extends around the upper end of the casing 15.

Connecting the screw threaded neck 14 with the closure plate 17 is the hydraulic cylinder 19. The opening or chamber 13 is in communication with the container 16 through the cylinder 19. The cylinder 19 is placed within the oil cylinder 15 and spaced slightly therefrom so as to provide a chamber 20 for receiving oil as will hereinafter be more fully set forth.

The chamber 20 is closed relative to the container 16 by the closure plate 17 at its upper end. At its lower end the chamber 20 is closed relative to the opening 13 by the neck 14.

Means of communication may be had from the chamber 20 to the opening 13 by way of a small passageway 21 having a valve 22 mounted therein. The valve 22 may properly be termed "the return valve" and is controlled from outside the boss 11 through the small handle 23. The cover 24 is secured to the upper end of the control 16 and is formed substantially at its center point with a discharge spout 25.

Hamburger or other pliable material of an edible nature is placed within the container 16 and forced therefrom through the discharge spout 25 by means of a piston 26. The piston 26 is mounted upon the piston rod 27 which is hydraulically operated as I will now describe in detail. The piston 27 includes a rubber piston ring 28 or the like, for preventing any juices or liquids from the edible material within the container above the piston 26 from passing therebelow.

The juices from the meat are thus caused to be forced up with the other material and forms a part of the completed patty. It is very desirable to have the juices form part of the completed patty and this is accomplished by the use of my piston which has the ring 28 thereon.

The boss 11 includes a casting or fitting 29 having a cylinder opening 30 therein in which is mounted a piston 31. The piston 31 is limited in its sliding movement by a pin 32 adapted to be received within a slot or notch 33 formed in the piston 31 proper.

A pressure check valve 34 is interposed between the opening 13 and the cylinder 30. The pressure check valve is constrained to move in a direction for permitting fluid or the like to pass from the cylinder 30 into the opening 13.

An adjusting screw 35 is mounted in the piston 31 and a spring 36 is mounted upon the screw 35 between the head thereof and the fitting 29. From the construction of the parts just described it will be noted that the piston 31 may be reciprocated within the cylinder 30 against the action of the spring 36 when moved in one direction and returned to normal position by the spring itself.

The fitting or casting 29 includes a passageway 37 which permits communication from the chamber 20 into the cylinder 30. A check valve 38 is positioned within the passageway 37 and normally holds the passageway in closed position.

The chamber 20 is designed to be filled with oil or other fluid. When the piston 31 is moved to its outer position relative to the cylinder 30, then it forces by suction the opening of the check valve 38 and permits oil from within the chamber 20 to pass into the cylinder 30.

When the piston 31 is returned it causes the check valve 38 to close and the pressure forces the oil or other fluid within the cylinder 30 to pass into the opening 13 against the action of the pressure check valve 34.

The lower end of the piston rod 27 is formed with a small piston 39 of the same diameter as the hydraulic cylinder 19. As additional fluid or oil is forced into the opening 13 it fills the cylinder 19 and causes the piston 39 to be raised which in turn causes the piston 26 to be raised.

The piston 31 is operated in unison with other parts of my hamburger press as will be apparent from the further description of my device. The cover 24 includes an extension 40 having a bearing opening 41 therein for receiving a shaft 42.

The shaft 42 has its lower end journaled in a hub or bearing 43 formed upon the base 10 as clearly shown in Figure 2 of the drawings.

Mounted upon the shaft 42 and fixed thereto is a cam 44 adapted to engage the adjusting screw 35 so that when the shaft 42 is rotated it imparts a reciprocating movement to the piston 31.

Mounted upon the shaft 41 above the extension 40 is a drive gear 44ª which is in mesh with an idler 45 mounted in the extension 40. The upper end of the shaft 42 is formed with a crank handle 46 whereby the shaft may be operated.

A pallet gear 47 is mounted upon the cover support 24 and is in mesh with the idler 45.

The cover support 24 is formed with an upturned rim 48 upon which rests the pallet gear 47. The pallet gear 47 includes a shoulder 49 which insures proper positioning of the pallet gear relative to the support 24.

At the center of the pallet gear 47 is formed an opening 50 in register with the spout 25. The pallet gear is formed with a number of molds or die openings 51 of any suitable size and shape.

Within each die opening 51 is an ejector pallet 52 which has a short stem 53 upon its bottom. The stem 53 projects through an opening formed in the bottom of the die opening 51.

The normal position of the ejector pallets 52 within the die opening 51 is such as to provide a space above the pallet itself.

Upon the extension 40 and above a portion of the pallet gear 47 I mount a cover 54 having an enlarged hood 55 formed thereon.

As the hamburger or other edible material within the container is forced upwardly it passes through the spout 25, through the opening 50, into the hood 55 and into the die opening 51.

The pallet gear 47 rotates and this causes each pallet ejector to at one time or another be entirely free from the cover 54 and when in this position it is necessary to raise the ejector pallet 52 so that the patties formed thereon may be removed.

Upon the pallet gear 47 I provide a cam surface 56 over which the stem 53 of each ejector pallet must travel once with each revolution of the pallet gear 47.

When the particular ejector pallet reaches the cam 56 it is forced upwardly as shown in Figure 5 of the drawings at which time the patties formed thereon may be slid therefrom with any suitable implement or spatula.

The cover 54 serves as a scraper and levels each patty formed within the die opening 51 as the pallet gear 47 is rotated. It will be noted that the cover 54 holds the pallet gear in position and that different pallet gears having various sizes or shapes of die openings therein may be substituted and thus the shape and size of the completed patties may be varied as desired.

After the ejector pallets 52 have been operated they again resume normal position due to the fact that the contents below the hood 55 forces them downwardly so that each die opening may be filled.

When it is desired to refill the container 16 all that is necessary is to raise the shaft 42 upwardly so that it is free from the bearing 43. The connection between the gear 44ª and the shaft 42 is such as to permit this sliding movement.

After the shaft 42 is free of the bearing 43, the entire cover support may be unscrewed from the container 16. The return valve 22 is opened so that the oil within the oil cylinder 19 may be again forced up into the chamber 20.

The filling of the container 16 will of course, force the piston 26 downwardly and this in turn forces the oil through the opening 21 into the chamber 20, after which the valve 22 may be again moved to closed position as shown in Figure 3 of the drawings.

The cover support is then again placed in position and the operation of the device may be again continued.

When it is desired to change pallet gears 47 all that is necessary is to remove the cover 54 by taking out the screw connections which hold the cover in position.

Around the container 16 may be placed an outside casing 57 which is open at its upper end and closed at its lower end for receiving ice or refrigerating coils whereby hamburger or other edible material within the container may be kept at proper temperature.

While I have described my device as applicable for use in connection with hamburger patties it will, of course, be understood that potato patties or patties of any edible material may be formed and my device is applicable for any plastic edible material.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A patty forming device comprising a container adapted to contain edible contents, means for ejecting said edible contents, a die supporting member rotatably mounted adjacent the ejecting end of said container and having a central opening through which the edible contents are ejected, said die supporting member having die pockets dies positioned in said die pockets, means for conducting the edible contents ejected from said container, to said die pockets, said die pockets being movable means for moving the dies for ejecting the contents therefrom and common means for operating said means for ejecting the contents of said container and moving said dies.

2. A patty forming device comprising a container adapted to contain edible contents, means for ejecting said edible contents, a die supporting member rotatably mounted adjacent the ejecting end of said container and having a central opening through which the edible contents are ejected, said die supporting member having die pockets dies positioned inside the die pockets, a hood covering a part of said dies, for conducting the contents ejected from said container to said die pockets and means for moving said dies and ejecting the contents from the die pockets when moved to position free of said hood.

3. A patty forming device comprising a container adapted to contain edible contents, movable dies positioned above the container in communication with said container, hydraulic means for forcing the contents into the dies during the movement thereof, said hydraulic means including a pump having a plunger spring actuated in one direction, a shaft, an eccentric thereon for engaging said plunger for operating said pump and moving said dies the length of said plunger being adjustable whereby different lengths of stroke may be imparted by said eccentric to the plunger and means for rendering the hydraulic means inoperative and permitting it to return to starting position.

4. A patty forming device comprising a container adapted to contain edible contents, movable dies positioned above the container and in communication therewith, hydraulic means for forcing the contents into the dies during the movement thereof, said hydraulic means including a piston device in said container, fluid in engagement with a part of said piston device, a pump for forcing said fluid against said piston device, a reservoir for the fluid in communication with said pump through a valve controlled passageway whereby fluid from the reservoir may be drawn therefrom and forced against said piston device for moving it within the container and ejecting the contents thereof into said die pockets, means for varying the stroke of the piston of said pump for varying the pressure exerted on the contents in said die pockets and a valve control for permitting the fluid to be returned into the reservoir when the piston device is being returned to starting position.

5. In a device of the class described, a container, means associated therewith for ejecting an edible commodity therefrom, a die supporting member having an opening through which said commodity is ejected, die pockets in said member, dies in said pockets, means for conducting said commodity into said pockets, means for moving said dies from filling position to ejecting position, said ejecting means and said last means operating in unison.

6. In combination with a food ejecting device, a disk having a central opening through which the food is ejected, pockets near the periphery of said disk and means for conducting the food to said pockets for filling them.

7. In combination with a food ejecting device, a disk having a central opening through which the food is ejected, pockets near the periphery of said disk and means for conducting the food to said pockets for filling them, said means comprising a hood covering the central opening and extending therefrom to position to cover each of the pockets as the disk is rotated.

8. In combination with a food ejecting device, a disk having a central opening through which the food is ejected, pockets near the periphery of said disk, means for conducting the food to said pockets for filling them, said means comprising a hood covering the central opening and extending therefrom to position to cover each of the pockets as the disk is rotated, and means for ejecting the contents of each of said pockets as the disk is rotated to position where the pockets are not covered by said hood.

DAVID A. WALLACE.